United States Patent [19]

McGrail

[11] 4,410,600
[45] Oct. 18, 1983

[54] COATED POLYESTER FILM AND POLYESTER/POLYOLEFIN LAMINATES PRODUCED THEREFROM

[75] Inventor: Patrick T. McGrail, Hitchin, England

[73] Assignee: Imperial Chemical Industries PLC, London, England

[21] Appl. No.: 404,489

[22] Filed: Aug. 2, 1982

[30] Foreign Application Priority Data

Aug. 17, 1981 [GB] United Kingdom ............... 8125097

[51] Int. Cl.³ ..................... B32B 27/08; B32B 27/36
[52] U.S. Cl. ................................ 428/483; 428/500; 428/516; 428/522; 428/910
[58] Field of Search ............ 428/483, 480, 516, 500, 428/521, 522

[56] References Cited

U.S. PATENT DOCUMENTS 4,328,283 5/1982 Nakadate et al. ................. 428/480

Primary Examiner—Thomas J. Herbert, Jr.
Attorney, Agent, or Firm—Cushman, Darby & Cushman

[57] ABSTRACT

A coated polyester film suitable for producing polyester/polyolefin laminates consists of biaxially oriented poly(ethylene terephthalate) film coated with a cross-linked styrene copolymer by deposition from an aqueous coating composition which comprises (A) a copolymer containing 50–75 mol % of styrene units and 25–50 mole % of comonomer units providing carboxylic groups (10–50 mole %) and alkyl carboxylate groups (20–50 mole %) and (B) a melamine/formaldehyde cross-linking agent. The styrene copolymer (A) is preferably a water-soluble copolymer of styrene and maleic anhydride partially converted into butyl ester and partially neutralized with ammonia, and the cross-linking agent (B) is conveniently hexamethoxymethylmelamine. The polyolefin layer in the laminates produced may in particular be of low-density polyethylene.

5 Claims, 3 Drawing Figures

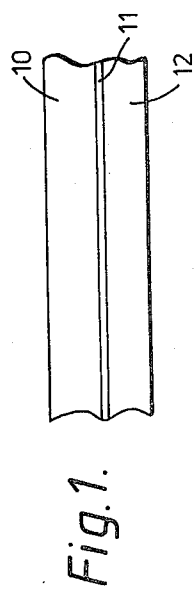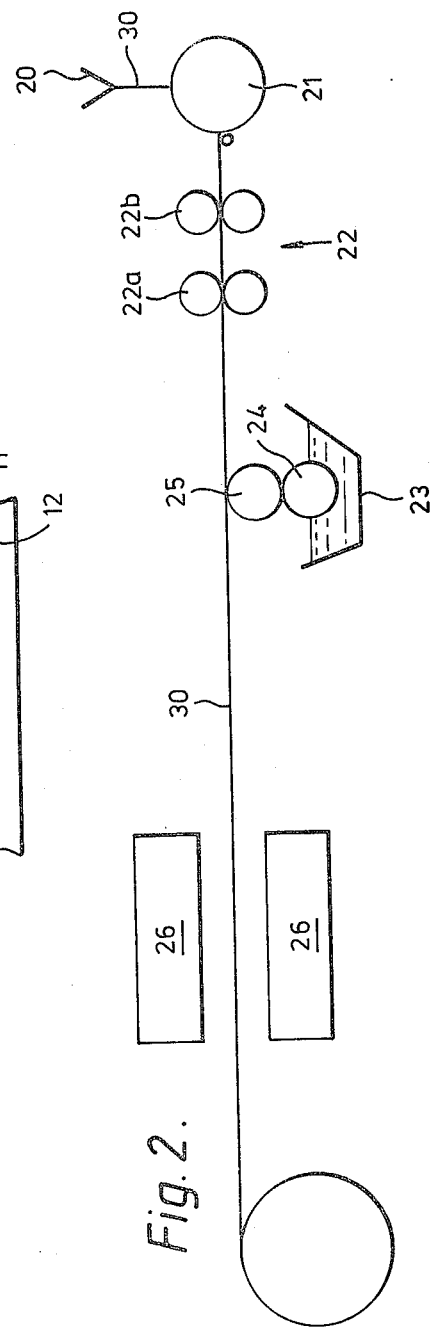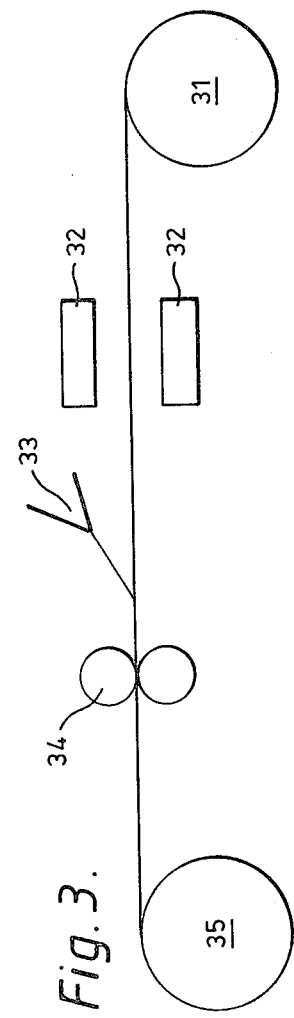

COATED POLYESTER FILM AND POLYESTER/POLYOLEFIN LAMINATES PRODUCED THEREFROM

This invention relates to coated polyester film and to polyester/polyolefin laminates produced therefrom and in particular to laminates having one layer of biaxially oriented poly(ethylene terephthalate) and another layer of polyethylene or of an ethylene copolymer containing up to 10 mole % of comonomer such as ethylene/vinyl acetate copolymer. Such laminates are extensively used for packaging. (For convenience poly(ethylene terephthalate) will be abbreviated to PET and polyethylene and ethylene copolymer to PE.)

Films of biaxially oriented PET have been made and used for many years and one important use is for packaging. Packaging films are often sealed by heating to the melting point and pressing together two sheets of film so that the two sheets become merged (this is usually known as "heat-sealing"). The melting is sufficient to destroy the orientation. This weakens the seal and therefore homogeneous PET films are not used for heat-sealing. When heat-sealing is needed the PET film is laminated to a component with a lower melting point, e.g. a polyester copolymer or a polyolefin such as polyethylene.

Thus PET/PE laminates are widely used for packaging. They are heat-sealable because the PE has a lower melting point than the PET. In addition the PE improves the permeability properties of the PET in some applications. As PET and PE have only poor direct adhesion it is necessary for the laminate to include an adhesion-promoting interlayer. The usual interlayers are cross-linked polyurethan resins. These are applied to one layer (usually the PET layer) from an organic solvent. The flammability of the solvent is a severe disadvantage and its restricts the methods of fabrication, e.g. flammable liquids cannot be used during the extrusion of the PET. This invention relates to interlayers which are applied from an aqueous medium.

According to the invention a coated polyester film for producing a packaging laminate comprising a layer of PET and a layer of PE with an adhesion-promoting interlayer between them is characterized in that the interlayer is coated on the PET and is a cross-linked styrene copolymer as hereinafter defined.

Preferably the PET layer is 6 $\mu$m to 400 $\mu$m thick and the PE layer is 2 $\mu$m thick to 200 $\mu$m thick. The interlayer is so thin that it makes only a negligible contribution to the total thickness; it is usually 10 to 1000 nm thick.

The interlayer is a cross-linked styrene copolymer deposited from an aqueous coating composition comprising:

(A) 100 parts by weight of a copolymer of:
  (i) 50–75 mole % of styrene units which may be alpha- and/or ring-substituted with methyl or halogen;
  (ii) 25–50 mole % of comonomer units selected from units of acrylic, methacrylic, itaconic and maleic acids, alkyl half-esters of itaconic and maleic acids, alkyl acrylates and methacrylates and dialkyl maleates;
  the comonomer units being such as to provide the copolymer with 10–50 mole % of carboxylic groups which may be present as salts (preferably ammonium salts) and 20–50 mole % of alkyl carboxylate groups in which the alkyl groups may each have up to 10 carbon atoms (and are preferably butyl groups);
(B) 10–20 parts by weight of cross-linking agent selected from condensation products of formaldehyde and melamine and said condensation products having hydroxyl groups converted into methoxy, ethoxy, propoxy or butoxy groups.

The coated films described above can be produced by conventional methods. For example the polyester film is conventionally extruded including forward and sideways draw. The interlayer is applied by offset gravure coating during this process as an aqueous dispersion of the styrene copolymer and the cross-linking agent. Heat is always used in the preparation of polyester film and this heat evaporates the water and assists the cross-linking. Because the drawing is carried out using radiant heat it is necessary to avoid substantial amounts of toxic or flammable components. Thus water is used as the vehicle of dispersion.

Scrap film coated with the interlayer can be reclaimed by re-extruding into film with fresh polyester.

In the aqueous composition for use in the coating,
(A) is preferably a water-soluble copolymer of 50–75 mole % of styrene units and 25–50 mole % of units of maleic anhydride which have been partially converted into butyl ester and partially neutralized with ammonia, and
(B) is preferably hexamethoxymethylmelamine or melamineformaldehyde condensate having a methoxymethyl:methylol ratio of at least 1:2.

The concentration in the aqueous composition of styrene copolymer plus cross-linking agent is conveniently 10 to 40 g/liter.

The aqueous composition may also contain additional ingredients, e.g. a catalyst to facilitate the cross-linking and a dispersant to keep the other ingredients in suspension. Suitable catalysts include ammonium chloride, ammonium nitrate, ammonium thiocyanate, ammonium dihydrogen phosphate, ammonium sulphate, diammonium hydrogen phosphate, p-toluenesulphonic acid or its ammonium or morpholinium salt, and maleic acid stabilized by reaction with a base.

The coated polyester, produced as described above, is overcoated with the polyolefin using a conventional melt-coating extrusion method. Immediately before overcoating it is desirable to treat the interlayer by corona discharge.

BRIEF DESCRIPTION OF THE DRAWINGS

Preferred embodiments of the invention will now be described by way of example with reference to the accompanying drawings in which:

FIG. 1 illustrates a preferred laminate according to the invention.

FIG. 2 illustrates the preferred method of applying the interlayer to the polyester layer, and FIG. 3 illustrates the preferred method of applying the polyolefin layer to the composite produced in FIG. 2 to obtain the laminate shown in FIG. 1.

The laminate illustrated in FIG. 1 comprises a polyester layer 10 and a polyolefin layer 12 with an interlayer 11 between them to promote adhesion.

The polyester layer 10 is 10–20 $\mu$m thick and it consists of poly(ethylene terephthalate) with balanced orientation. The polyolefin layer is 15–80 $\mu$m thick and it consists of polyethylene.

The interlayer is of negligible thickness, about 25 nm, and it consists of a cross-linked styrene copolymer. It is conveniently defined by the styrene copolymer and the cross-linking agent from which it was derived. Specific examples of interlayers are given hereinafter.

The total thickness of the laminate is between 25 and 100 μm and the polyester 12 comprises 15-40% of the total thickness.

The laminate shown in FIG. 11 is conveniently produced by a two-stage process. The first stage, using the equipment illustrated diagrammatically in FIG. 2, is a process for making coated polyester film. As indicated in FIG. 2 molten PET is extruded through a die 20 onto a quenching drum 21 to produce a film 30. After quenching, the film 30 is reheated to 80° C. and passed to a longitudinal draw station 22. This comprises a secondary nip 22b which runs 3.5 times as fast as the primary nip 22a. Thus the draw ratio in the longitudinal direction, i.e. the machine direction, is 1:3.5.

The drawn film is coated on its underside using a conventional offset-gravure technique. The coating station comprises a bath 23 which contains the aqueous coating composition. A constant level is maintained in the bath 23; the constant level device is not shown. A steel gravure roller 24 rotates in the bath; it has surface grooves which pick up the aqueous composition and transfer it to the offset roller 25 which is made of rubber. The offset roller 25 transfers the aqueous composition to the underside of the film 30. The grooves in the gravure roller 24 meter the composition so that a uniform coating is obtained.

After coating the film 30 passes between radiant heaters 26. It is gripped by the clips of a conventional stenter (not shown in any drawing). The width is increased 3.5 times, i.e. the sideways draw ratio is 1:3.5. During the draw the temperature is 105° C. After the draw the film is held at the extended width with temperature in the range 150° to 230° C. for heat-setting.

As the film 30 passes between the heaters 26 the water from the coating composition is evaporated. The heat also assists the cross-linking of the styrene copolymer. It is essential to use an aqueous composition because flammable solvents, e.g. alcohol, would ignite during the heating. Coating between the draws is simple and there is no need for separate treatments to dry and cure the coating. In addition the draw reduces the thickness of the coating. Using a solids content of 30 g/liter a coating 25 nm thick is produced. The coated polyester film is transferred to a conventional melt-coating process, using equipment illustrated diagrammatically in FIG. 3. In commercial practice it may be convenient for one manufacturer to make the coated polyester film and sell the composite to a second manufacturer who would apply the polyolefin to obtain the laminate shown in FIG. 1.

As indicated in FIG. 3 the composite from FIG. 2 is supplied from roll 31 and passed through a corona discharge station 32. The corona discharge modifies the coated surface to improve its adhesive properties. Immediately after treatment the polyolefin is extruded onto the coated surface from a die 32. The two layers are pressed together by rollers 34 and the final laminate, described in FIG. 1, is wound up at 35.

Specific examples of interlayers will now be described. In each case the interlayer will be defined in terms of the aqueous composition in which it is coated onto the polyester. In these examples (i) is the styrene copolymer, (ii) is the cross-linking agent, (iii) is the emulsifier and (iv) is the cross-linking catalyst. (The hexamethoxymethylmelamine used in these examples was obtained from American Cyanamid under the Trade Mark "Cymel" 300. The surfactant 'Synperonic' N was a nonyl phenol condensate with about 9.5 moles of ethylene oxide, commercially available from Imperial Chemical Industries.)

EXAMPLE 1

(i) Styrene/maleic anhydride copolymer in mole ratio 50/50 partially converted into an n-butyl ester (degree of esterification 35–50%) and partially neutralized with ammonia (pH 9), commercially available as SMA 144OH resin (Arco Chemical Co).

(ii) Hexamethoxymethylmelamine, 15% w/w on (i).

(iii) 'Synperonic' N, 12.5% w/w on (i).

(iv) Ammonium p-toluene sulphonate, 0.07% w/v.

EXAMPLE 2

(i) Styrene/butyl acrylate/itaconic acid copolymer in mole ratio 75/20/5.

(ii) Hexamethoxymethylmelamine, 15% w/w on (i).

(iii) 'Synperonic' N, 12.5% w/w on (i).

(iv) Ammonium p-toluene sulphonate, 0.07% w/v.

EXAMPLE 3

(i) Styrene/maleic anhydride copolymer in mole ratio 50/50 partially converted into a butyl ester, commercially available as SMA 144OH resin (Arco Chemical Co).

(ii) Melamine-formaldehyde resin with a methoxymethyl:methylol ratio of about 1:2, commercially available as 'Beetle' BE 336 (BIP Chemials Ltd), 15% w/w on (i).

(iii) 'Synperonic' N, 12,5% w/w on (i).

(iv) Ammonium p-toluene sulphonate, 0.07% w/v.

Each of these compositions was coated onto poly(ethylene terephthalate) film as described with reference to FIG. 2 using a coating solution containing 30 g/liter of active (solid) ingredients. In each case the polyester was 12 μm thick with a coating about 25 nm thick. A layer of low-density polyethylene was overcoated as described with reference to FIG. 3 giving a laminate as illustrated in FIG. 1. The thickness of the polyolefin layer and the nature of the interlayer are given in Table 1.

TABLE 1

| Example | Interlayer from Example | Thickness Polyethylene | Total Thickness | % PET |
|---------|------------------------|------------------------|-----------------|-------|
| 1A | 1 | 50 μm | 62 | 19% |
| 2A | 2 | 20 μm | 32 | 37% |
| 3A | 3 | 50 μm | 62 | 19% |

The bond strength of each of these laminates was assessed using an Instron tensile tester to pull the layers apart horizontally while the remaining laminate was allowed to hang vertically. Separation was continued until one or both layers tore; the force per cm of strip applied at this time is given in Table 2.

TABLE 2

| Example | Bond Strength | Failure Mode |
|---------|---------------|--------------|
| 1A | 660 | PE tore |
| 2A | 360 | PE yield |
| 3A | 500 | PE tore |

(Bond strengths below 300 g/cm would not be regarded as satisfactory.)

Laminates having satisfactory bond strengths were also made from PET coated with the interlayer of Example 1 and an overcoat of ethylene/vinyl acetate copolymer containing 5.5 mole % of vinyl acetate or an overcoat of high-density polyethylene.

PET was satisfactorily coated with the interlayer of Example 1 using an aqueous coating composition containing 15 g/liter of active (solid) ingredients instead of 30 g/liter. At this concentration the composition was less viscous and enabled higher coating speeds to be achieved; by coating at 160 m/min a dry coat thickness of 6.3 nm was achieved. The coated film was overcoated with low-density polyethylene as described above to give laminates of satisfactory bond strength.

PET film coated with the interlayer of Example 1 at 30 g/liter was re-extruded and re-filmed to give new film of acceptable quality when tested for yellowness and haze. It is therefore possible to recover scrap coated PET film produced according to the invention by re-extrusion into the film-making process.

I claim:

1. Coated polyester film which consists of biaxially oriented poly(ethylene terephthalate) film coated with a cross-linked styrene polymer which is deposited from an aqueous coating composition comprising:
    (A) 100 parts by weight of a copolymer of:
        (i) 50-75 mole % of styrene units which may be alpha- and/or ring-substituted with methyl or halogen;
        (ii) 25-50 mole % of comonomer units selected from units of acrylic, methacrylic, itaconic and maleic acids, alkyl half-esters of itaconic and maleic acids, alkyl acrylates and methacrylates and dialkyl maleates;
        the comonomer units being such as to provide the copolymer with 10-50 mole % of carboxylic groups which may be present as salts and 20-50 mole % of alkyl carboxylate groups in which the alkyl groups may each have up to 10 carbon atoms;
    (B) 10-20 parts by weight of cross-linking agent selected from condensation products of formaldehyde and melamine and said condensation products having hydroxyl groups converted into methoxy, ethoxy, propoxy or butoxy groups.

2. Coated polyester film according to claim 1 in which (A) is a water-soluble copolymer of 50-75 mole % of styrene units and 25-50 mole % of units of maleic anhydride which have been partially converted into butyl ester and partially neutralized with ammonia.

3. Coated polyester film according to claim 1 in which (B) is hexamethoxymethylmelamine or melamine-formaldehyde condensate having a methoxymethyl-methylol ratio of at least 1:2.

4. Polyester/polyolefin laminate which consists of coated polyester film as claimed in claim 1 overcoated with a layer of polyethylene or of ethylene copolymer containing up to 10 mole % of comonomer.

5. Polyester/polyolefin laminate according to claim 4 in which the polyolefin is low-density polyethylene.

* * * * *